United States Patent [19]
Lee

[11] Patent Number: 6,011,364
[45] Date of Patent: Jan. 4, 2000

[54] UPPER AND LOWER DISTORTION CORRECTING CIRCUIT BY MODES

[75] Inventor: Seung-Taek Lee, Suwon-si, Rep. of Korea

[73] Assignee: SamSung Electronics Co., Ltd., Suwon, Rep. of Korea

[21] Appl. No.: 08/985,180

[22] Filed: Dec. 4, 1997

[30] Foreign Application Priority Data

Dec. 4, 1996 [KR] Rep. of Korea ............................ 61620
Dec. 4, 1996 [KR] Rep. of Korea ............................ 61621
Dec. 4, 1996 [KR] Rep. of Korea ............................ 61622
Dec. 4, 1996 [KR] Rep. of Korea ............................ 61623

[51] Int. Cl.$^7$ .................................................. H01J 29/56
[52] U.S. Cl. ........................................... 315/371; 315/370
[58] Field of Search ................................. 315/367, 370, 315/371; 348/806

[56] References Cited

U.S. PATENT DOCUMENTS

| | | | |
|---|---|---|---|
| 4,668,897 | 5/1987 | Haferi | 315/371 |
| 4,748,384 | 5/1988 | Oliver | 315/371 |
| 4,764,709 | 8/1988 | Oliver | 315/370 |
| 4,777,411 | 10/1988 | O'Conner et al. | 315/371 |
| 4,845,409 | 7/1989 | Oliver | 315/371 |
| 5,449,982 | 9/1995 | Ando | 315/371 |
| 5,583,400 | 12/1996 | Hulshof et al. | 315/371 |
| 5,780,978 | 7/1998 | Bang | 315/382.1 |

*Primary Examiner*—Edward P. Westin
*Assistant Examiner*—Nikita Wells
*Attorney, Agent, or Firm*—Robert E. Bushnell, Esq.

[57] ABSTRACT

An upper and lower distortion correcting circuit by modes in a display device which displays a video signal as a visible image, includes: a parabolic generator for receiving a vertical pulse to generate a parabolic wave in accordance with the received vertical pulse; a multivibrator for s receiving a horizontal pulse outputted from a microcomputer and for triggering the horizontal pulse in accordance with a horizontal balance signal outputted from a digital to analog converter to adjust and output a triggered horizontal pulse having a controlled duty cycle; a multiplier for multiplying the horizontal pulse outputted from the multivibrator and the parabolic wave outputted from the parabolic generator to thereby output a correction current; a buffer for stabilizing and outputting a gain of the correction current outputted from the multiplier; an amplifying portion for receiving and amplifying the gain of the correction current outputted from the buffer; and a modulation portion for receiving the correction current outputted from the amplifying portion and the vertical pulse and for superimposing the correction current and the vertical pulse to generate a combined correction wave.

13 Claims, 14 Drawing Sheets

UPPER AND LOWER DISTORTION CORRECTING CIRCUIT BY MODES

CLAIM OF PRIORITY

This application makes reference to, incorporates the same herein, and claims all benefits accruing under 35 U.S.C. §119 from four applications each entitled UPPER AND LOWER DISTORTION CORRECTING CIRCUIT BY MODES, all of them filed in the Korean Industrial Property Office on the $4^{th}$ of Dec. 1996 and there duly assigned Ser. No. 61620/1996, 61621/1996, 61622/1996, and 61623/1996.

BACKGROUND OF THE INVENTION

1. Field of the Invention

The present invention relates to an upper and lower distortion correcting circuit by modes, and more particularly, to an upper and lower distortion correcting circuit by modes which can correct upper and lower distortion generated in a display monitor which receives and displays video signals generated by a personal computer (hereinafter referred simply to as a "PC").

2. Related Art

Generally, a display monitor receives a video signal generated by a PC body and displays the received video signal on a display screen. In more detail, the display monitor amplifies the video signal generated by the PC through a video amplifying circuit and then displays the amplified video signal as a visible image on a cathode-ray tube (hereinafter, referred to as a "CRT"). To this end, the display monitor needs a sawtooth current for synchronizing the video signal.

The sawtooth current enables horizontal and vertical synchronous signals generated by the PC to be transmitted and processed through a microcomputer within the display monitor and is generated in accordance with the periods of horizontal and vertical pulses. The horizontal and vertical pulses generated by the microcomputer are supplied to a deflection circuit and synchronize the video signal through a deflection yoke attached to a neck of the CRT, to thereby display the video signal as a visible image.

Since a display monitor is provided with an upper and lower distortion correcting circuit having a non-linearity feature, there occurs a problem in that a non-linearity current, that is, a secondary functional current, must be supplied to the correction circuit. Furthermore, there occur another problem in that the screen distortion correcting circuit is used only in a single mode, that is, at a single frequency, and has a fixed amount of distortion correction.

SUMMARY OF THE INVENTION

Accordingly, the present invention is directed to an upper and lower distortion correcting circuit by modes that substantially obviates one or more of the problems due to the limitations and disadvantages of the related art.

An object of the invention is to provide an upper and lower distortion correcting circuit by modes which adjusts a correction position by varying an integral amount of a horizontal output signal, amplifies a voltage of the position corrected signal to adjust a correction size, and superimposes the corrected horizontal output signal with a vertical output signal having an variable vertical period according to a frequency size supplied from a modulation portion to thereby supply the superimposed signal to a vertical deflection yoke, such that the upper and lower distorted video can be corrected.

To accomplish this and other objects of the present invention, there is provided an upper and lower distortion correcting circuit by modes in a display device which displays a video signal as a visible image, including: a parabolic generator for receiving a vertical pulse to generate a parabolic wave in accordance with the received vertical pulse; a multivibrator for receiving a horizontal pulse outputted from a microcomputer and for triggering the horizontal pulse in accordance with a horizontal balance signal outputted from a digital to analog converter to adjust and output a triggered horizontal pulse having a controlled duty cycle; a multiplier for multiplying the horizontal pulse outputted from the multivibrator and the parabolic wave outputted from the parabolic generator to thereby output a correction current; a buffer for stabilizing and outputting a gain of the correction current outputted from the multiplier; an amplifying portion for receiving and amplifying the gain of the correction current outputted from the buffer; and a modulation portion for receiving the correction current outputted from the amplifying portion and the vertical pulse and for superimposing the correction current and the vertical pulse to generate a synthesized correction wave.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
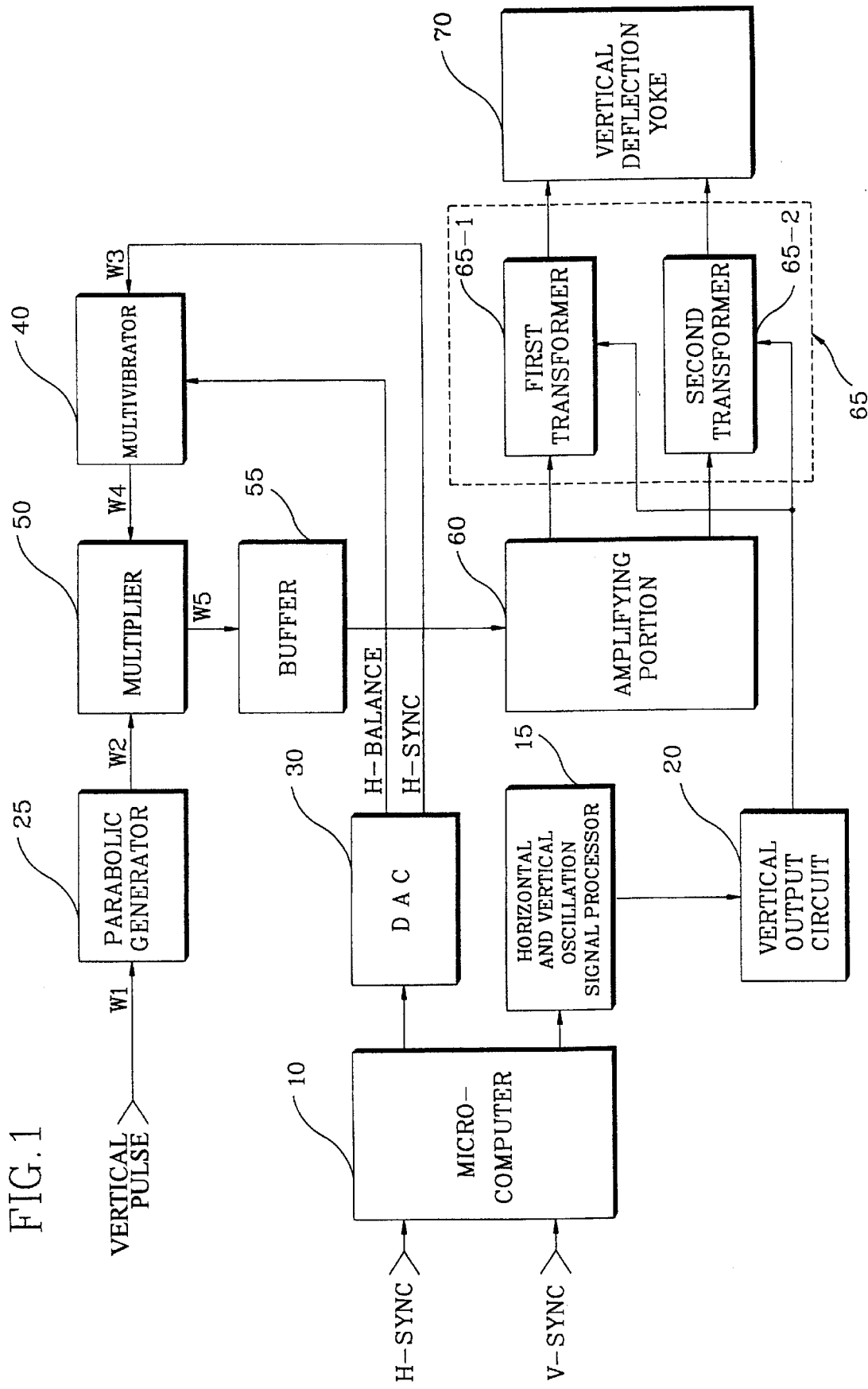
FIG. 1 is a block diagram illustrating an upper and lower distortion correcting circuit by modes according to the present invention.

FIG. 1 is a block diagram illustrating an upper and lower distortion correcting circuit by modes according to the present invention. A microcomputer 10 receives horizontal and vertical synchronous signals, H-SYNC and V-SYNC, supplied from a PC (not shown) and discriminates a video mode according to the received signals to thereby output a video controlling and adjusting signal, a reference oscillation signal, and a horizontal synchronous signal, by the discriminated modes. A horizontal and vertical oscillation signal processor 15 receives the reference oscillation signal from the microcomputer 10 and outputs a vertical oscillating wave according to the received oscillation signal, and a vertical output circuit 20 receives the vertical oscillating wave from the horizontal and vertical oscillation signal processor 15 and generates a vertical pulse according to the vertical oscillating wave. A parabolic generator 25 receives the vertical pulse and generates a parabolic wave according to the vertical pulse, and a digital to analog converter (hereinafter, referred to as a "DAC") 30 receives the video controlling and adjusting signal according to the video mode outputted from the microcomputer 10 and converts the received digital signal into an analog signal. A multivibrator 40 receives a horizontal pulse according to the horizontal synchronous signal H-SYNC outputted from the microcomputer 10 to trigger the received horizontal pulse with a horizontal balance signal H-BALANCE outputted from the DAC 30 and adjusts a duty cycle of the horizontal pulse to thereby output an adjusted horizontal pulse. A multiplier 50 multiplies the adjusted pulse outputted from the multivibrator 40 and the parabolic wave outputted from the parabolic generator 25 to thereby output a correction current, and a buffer 55 outputs in a stable state the correction current outputted from the multisupplier 50. An amplifying portion 60 receives the correction current from the buffer 55 and amplifies the gain of the correction current, and a modulation portion 65 receives the correction current outputted from the amplifying portion 60 and the vertical pulse supplied from the vertical output circuit 20 and superimposes the received correction current and vertical pulse to thereby generate a combined correction wave. Finally, a vertical deflection yoke 70 receives the combined correction wave outputted from the modulation portion 65 and corrects a vertical deflection angle of an electron beam to thereby correct upper and lower video distortion.

The modulation portion 65 is preferably comprised of a first transformer 65-1 and a second transformer 65-2 which each receive and superimpose the correction current outputted from the amplifying portion 60 and the vertical pulse supplied from the vertical output circuit 20.

The horizontal and vertical synchronous signals, H-SYNC and V-SYNC, are outputted from the PC to synchronize the video displayed on the screen of the display monitor and are then supplied to the microcomputer 10 within the display monitor. The microcomputer 10 senses the horizontal and vertical synchronous signals, H-SYNC and V-SYNC, to discriminate a video signal mode outputted from the PC. If the video signal mode is discriminated, the microcomputer 10 outputs a control signal, a screen adjusting signal, and the horizontal and vertical synchronous signals, H-SYNC and V-SYNC, supplied from the a PC according to the discriminated result.

Also, the microcomputer 10 generates the reference oscillation signal used as a reference of an oscillation signal and supplies the reference oscillation signal to the horizontal and vertical oscillation signal processor 15. Then, the horizontal and vertical oscillation signal processor 15 outputs the vertical oscillating wave according to the reference oscillation signal, which is supplied to the vertical output circuit 20 in which the vertical pulse is outputted according to the vertical oscillating wave.

The parabolic generator 25 receives the vertical pulse according to a vertical flyback signal V-FLB and generates the parabolic wave in accordance with vertical period of the received vertical pulse. Meanwhile, the screen adjusting signal outputted from the microcomputer 10 is supplied to the DAC 30, in which the supplied digital signal is converted into an analog adjusting signal.

The horizontal pulse according to the horizontal synchronous signal H-SYNC outputted from the microcomputer 10 is supplied to the multivibrator 40 in which the horizontal balance signal H-BALANCE signal supplied from the DAC 30 is received as a clock signal to thereby adjust the duty cycle of the supplied horizontal pulse. At that time, the multivibrator 40 generates the adjusted horizontal pulse based upon an RC time constant of an integrator (not shown) including a resistor and a capacitor therewithin. The multiplier 50 receives the adjusted horizontal pulse outputted from the multivibrator 40 and the parabolic wave outputted from the parabolic generator 25. As a result, the multiplier 50 outputs a correction current which is used to correct the upper and lower distortion generated on the display monitor screen.

The correction current is outputted in a stable state by means of the buffer 55, in which the gain of the correction current outputted from the multiplier 50 can be stably outputted, without any variation. The correction current outputted from the buffer 55 is amplified by a predetermined level and is supplied to the modulation portion 65.

The amplified correction current is supplied to each of the first and second transformers 65-1 and 65-2 within the modulation portion 65, in which the supplied correction current is combined with the vertical pulse supplied from the vertical output circuit 20. That is, the first and second transformers 65-1 and 65-2 within the modulation portion 65 combine the vertical pulse and the supplied correction current to thereby supply the combined correction wave to the vertical deflection yoke 10.

Next, the vertical deflection yoke 70 adjusts a vertical deflection angle of the electron beam generated through an electron gun(not shown) in accordance with the combined correction wave and corrects upper and lower video distortion displayed on the display monitor screen. As the electron beam is moved from the left end to the center portion, the vertical deflection angle is increased, and as the electron beam is moved from the center portion to the right end, the vertical deflection angle is decreased.

Further, a front vertical scanning is superimposed in a negative(−) direction and a rear vertical scanning in superimposed in a positive (+) direction. The amplitude of the vertical scanning is in a maximum level at the beginning and ending portions of the scan and is in a minimum level at the center portion of the scan. Accordingly, with the combined correction wave generated according to the video mode, the upper and lower distortion of the video generated at the frequency according to various video modes can be corrected.

Figure 2:
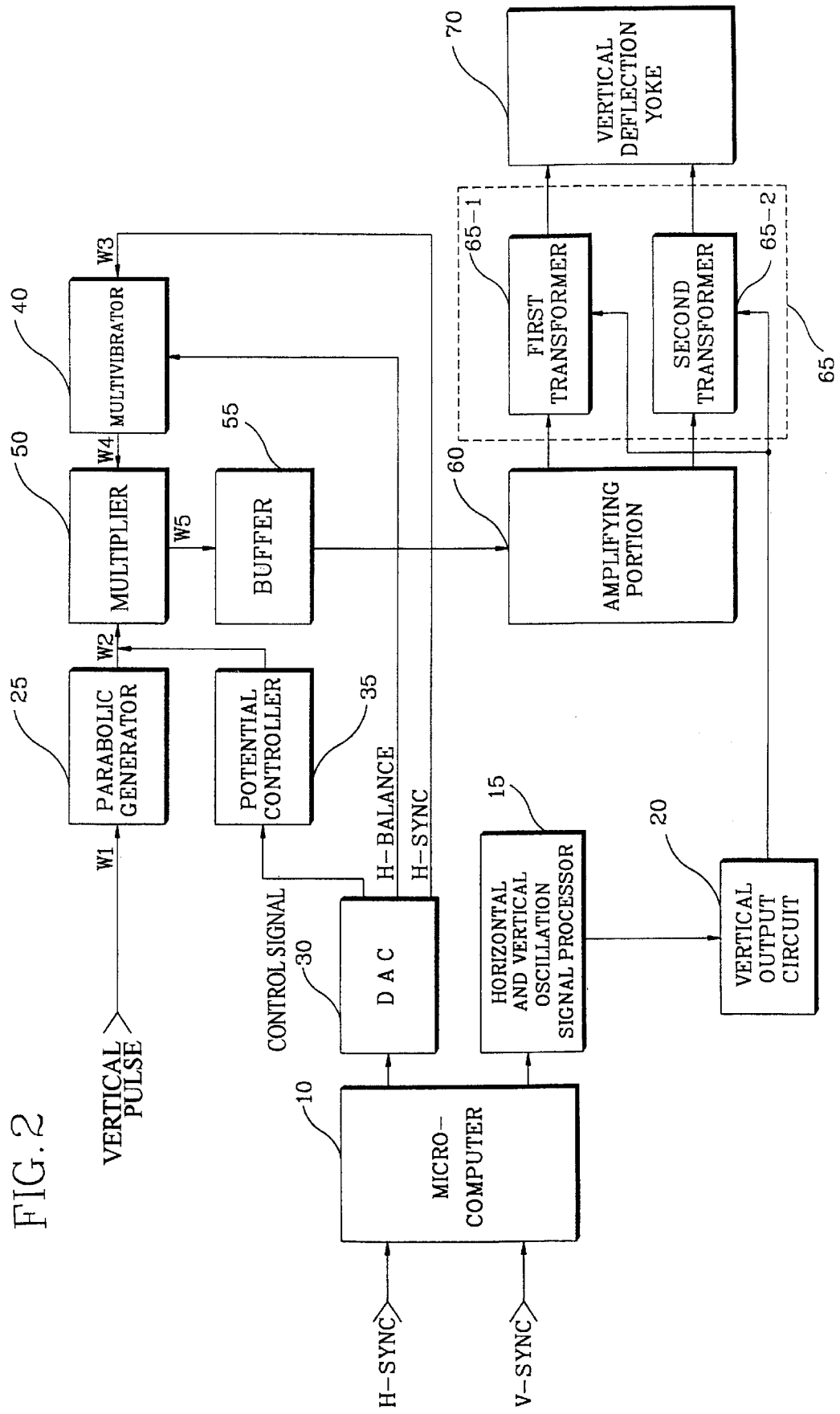
FIG. 2 is a block diagram illustrating an upper and lower distortion correcting circuit by modes according to a first embodiment of the present invention.

FIG. 2 is a block diagram illustrating an upper and lower distortion correcting circuit by modes according to a first embodiment of the present invention. When compared with the construction of FIG. 1, the upper and lower distortion correcting circuit by modes according to a first embodiment of the present invention further comprises a potential controller 35, which will be discussed hereinafter.

The potential controller 35 receives a video control signal according to the video mode from the DAC 30 and outputs a potential signal according to the video control signal; the multivibrator 40 receives the horizontal pulse according to the horizontal synchronous signal H-SYNC outputted from the microcomputer 10 to trigger the received horizontal pulse with the horizontal balance signal H-BALANCE outputted from the DAC 30 and adjusts a duty cycle of the horizontal pulse to thereby output an adjusted horizontal pulse, and the multiplier 50 multiplier the adjusted pulse outputted from the multivibrator 40, the parabolic wave outputted from the parabolic generator 25, and the potential signal outputted from the potential controller 35 to thereby output a correction current.

Figure 3:
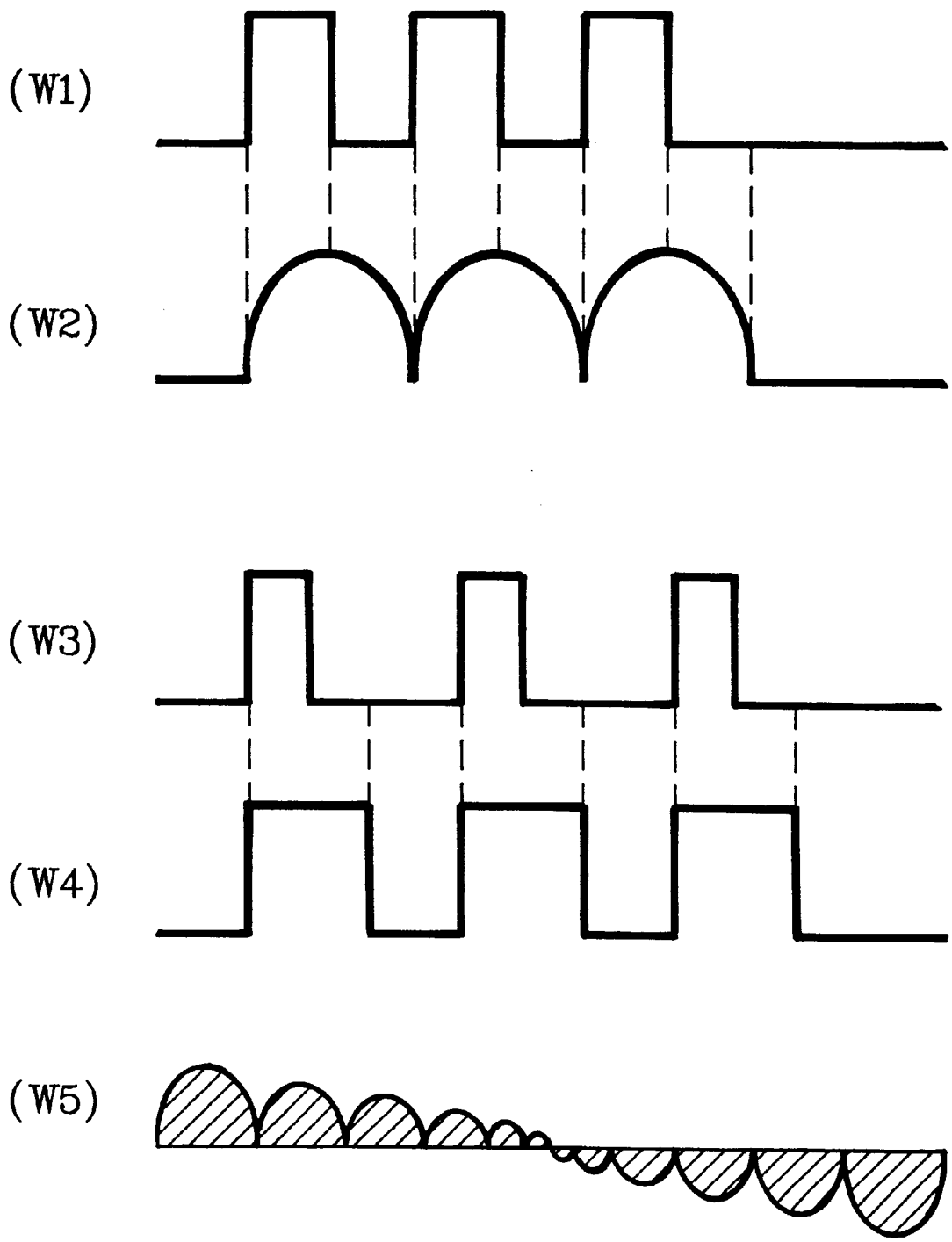
FIG. 3 is a waveform diagram illustrating output waveforms from respective blocks of FIGS. 1 and 2.

FIG. 3 is a waveform, diagram illustrating output waveforms from respective blocks of FIGS. 1 and 2. A waveform "W1" indicates the vertical pulse, a waveform "W2" indicates the parabolic wave generated by the parabolic generator 25 according to the period of the vertical pulse, a waveform "W3" indicates the adjusted horizontal pulse, and a waveform "W4" indicates the horizontal pulse from the multivibrator 40 in which the duty cycle of the pulse has been adjusted.

Finally, a waveform "W5" indicates the correction current generated by the multiplier 50 which synthesized the waveforms "W2" and "W4". In this case, the curved surfaces hatched upwardly correspond to a corrected amount of upper distortion on the display monitor screen, whereas the curved surfaces hatched downwardly correspond to a corrected amount of lower distortion on the display monitor screen.

The waveform "W5" according to the correction current is superimposed on the vertical pulse through the modulation portion 65, which will be discussed with reference to FIG. 4.

Figure 4:
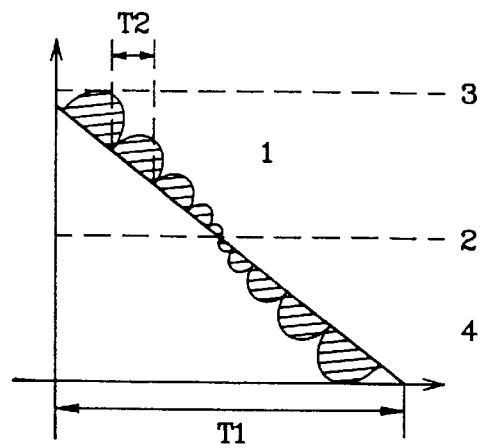
FIG. 4 is a graph illustrating output waveforms from the modulation portion of FIGS. 1 an 2.

FIG. 4 is a graph illustrating output waveforms from the modulation portion of FIGS. 1 and 2. As shown in FIG. 4, the horizontal direction of the graph indicates a vertical period T1, and the width of each of the hatched curved surfaces indicates a horizontal period T2.

An inclination "1" indicates an optimal operation point in which the upper and lower video distortion is generated in the display monitor screen. A central line "2" indicating the center or the inclination "1" represents the center of the display monitor screen, and an amount of upper distortion correction "3" and an amount of lower distortion correction "4" are shown on the basis of the central line "2", in which the end of the upper direction is at a maximum point of the amount of upper distortion correction and the end of the lower direction is at a maximum point of the amount of lower distortion correction.

First, the construction and operation of the parabolic generator 25 for generating the parabolic wave will be discussed with reference to FIG. 5.

Figure 5:
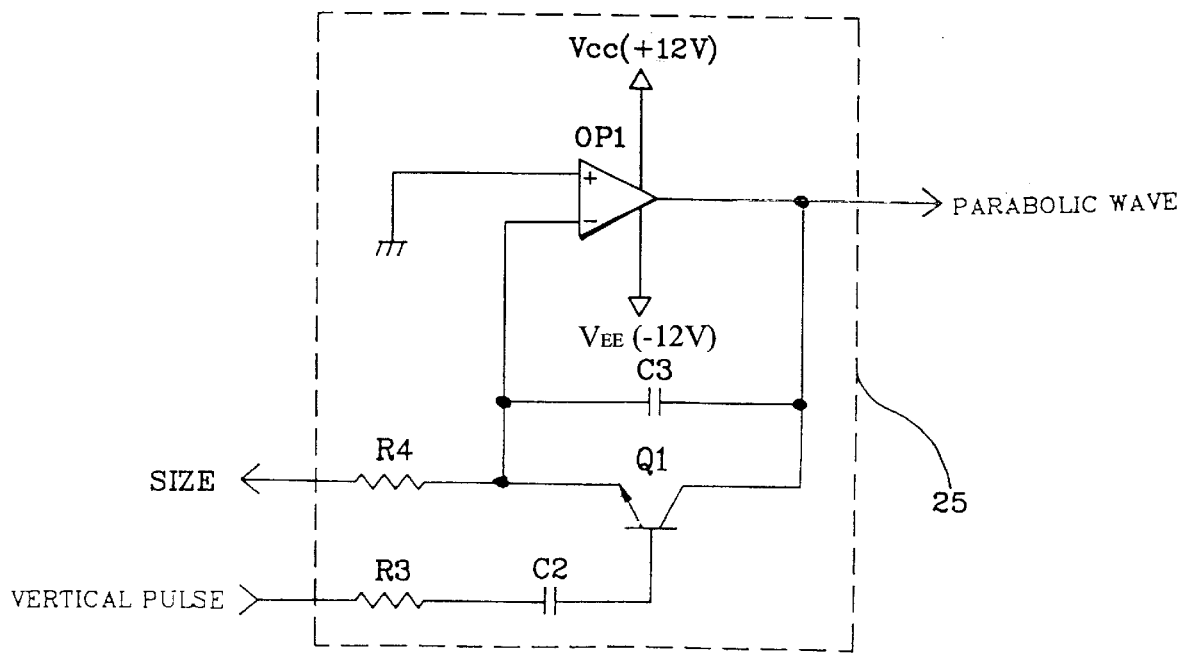
FIG. 5 is a detailed circuit diagram illustrating the parabolic generator of FIGS. 1 and 2.

FIG. 5 is a detailed circuit diagram illustrating the parabolic generator of FIGS. 1 and 2. The parabolic generator 25 is comprised of: a transistor Q1 which receives the vertical pulse signal and is switched in accordance with the received vertical pulse signal; an operational amplifier OP1 which receives an output signal from the transistor Q1 and compares the output signal with a ground voltage to output the compared result; resistors R3 and R4 and capacitors C2 and C3.

The vertical pulse according to the vertical flyback signal is supplied via the resistor R3 and the capacitor C2 to the base terminal of the transistor Q1. The transistor Q1 is switched according to the supplied vertical pulse and outputs the output pulse. The output pulse is charged or discharged by the capacitor C3. The waveform of the second capacitor C3 is supplied to the inverted terminal of the operational amplifier OP1 and the ground voltage is supplied to the non-inverted terminal thereof.

The operational amplifier OPI compares the output waveform from the capacitor C3 with the ground voltage to output the parabolic wave. At this time, in case of a positive polarity period, the operational amplifier OP1 is driven by a power supply voltage Vcc of +12 V, and in case of a negative polarity period, the operational amplifier OP1 is driven by a voltage Vee of −12 v. A size adjusting signal is outputted from the resistor R4.

Secondly, the construction and operation of the potential controller 35 of FIG. 2 will be discussed with reference to FIG. 6.

Figure 6:
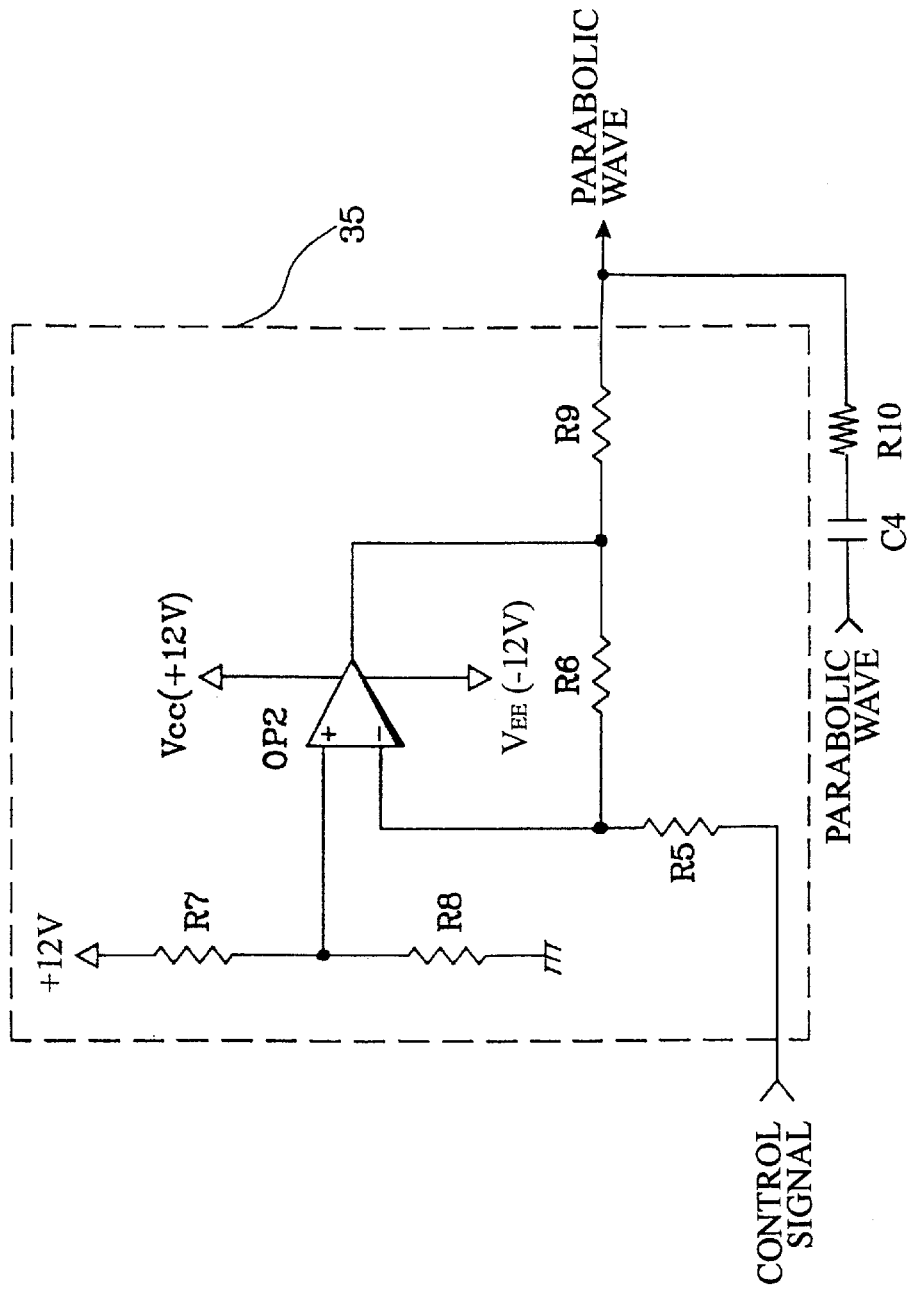
FIG. 6 is a detailed circuit diagram illustrating a potential controller of FIG. 2.

FIG. 6 is a detailed circuit diagram illustrating the potential controller of FIG. 2. The potential controller 35 is comprised of: an operational amplifier OP2 to which the control signal is supplied, and a plurality of resistors R5 to R9. A resistor R10 and a capacitor C4 is also illustrated.

The control signal outputted from the DAC 30 is supplied to the inverted terminal of the operational amplifier OP2 via the resistor R5 and a voltage of +12 V which is divided by the resistors R7 and R8 is then supplied to the non-inverting terminal of the operational amplifier OP2. The operational amplifier OP2 is driven by a power supply voltage Vcc of +12 V and a voltage Vee of −12 V. The operational amplifier OP2 outputs the potential signal according to the applied control signal.

In other words, the operational amplifier OP2 receives the control signal according to the video mode and outputs the potential level by modes to the resistor R9. The resistor R6 is used as a negative feedback path for stabilizing the output of the operational amplifier OP2.

The potential level outputted through the resistor R9 is combined with the parabolic wave supplied through the capacitor C4 and the resistor R10. Since the potential level and the parabolic wave are combined, the parabolic wave has different potentials by modes.

Figure 7:
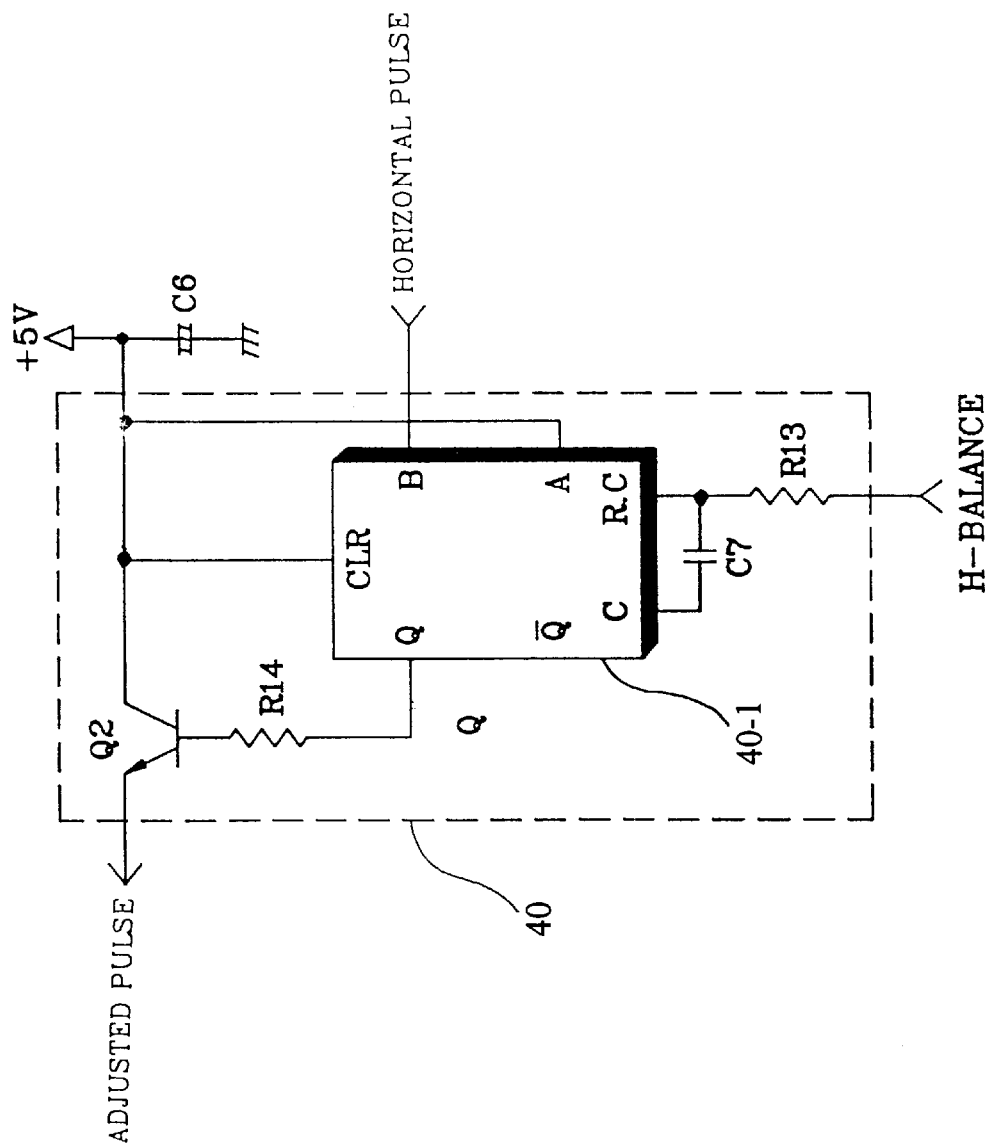
FIG. 7 is a detailed circuit diagram illustrating the multivibrator of FIGS. 1 and 2.

An explanation of the construction and operation of the multivibrator will be discussed with reference to FIG. 7.

The multivibrator 40 is comprised of: a multivibrator integrated circuit (IC) 40-1 within the multivibrator 40 which receives the horizontal pulse to trigger the horizontal pulse in accordance with the horizontal balance signal H-BALANCE outputted from a digital to analog converter and adjusts and outputs a triggered horizontal pulse having a controlled duty cycle, a transistor Q2 which receives the triggered horizontal pulse outputted from the multivibrator IC 40-1, resistors R13 and R14, and capacitors C6 and C7.

The horizontal pulse according to the horizontal synchronous signal H-SYNC output from the microcomputer 10 is supplied to an input terminal "B" of the multivibrator IC 40-1, and a driving voltage is applied to an input terminal "A" of the multivibrator IC 40-1.

On the other hand, the horizontal balance signal H-BALANCE is supplied via the resistor R13 and the capacitor C7 to an input terminal "C" of the multivibrator IC 40-1.

The horizontal balance signal H-BALANCE is transformed into a sawtooth wave through the resistor R13 and the capacitor C7 to trigger the multivibrator IC 40-1. In other words, the timing of triggering is determined in accordance with the horizontal balance signal H-BALANCE for the video mode to define the amplitude of the horizontal pulse supplied from the microcomputer 10.

If the timing of triggering is determined by video modes, the pulse having its amplitude adjusted by modes is outputted through an output terminal "Q" of the multivibrator IC 40-1. The adjusted output pulse is supplied to the base terminal of the transistor Q2 via the resistor R14, and the transistor Q2 is switched in accordance with the supplied amplitude adjusted pulse and outputs the adjusted pulse. The capacitor C6 is used for smoothing.

Figure 8:
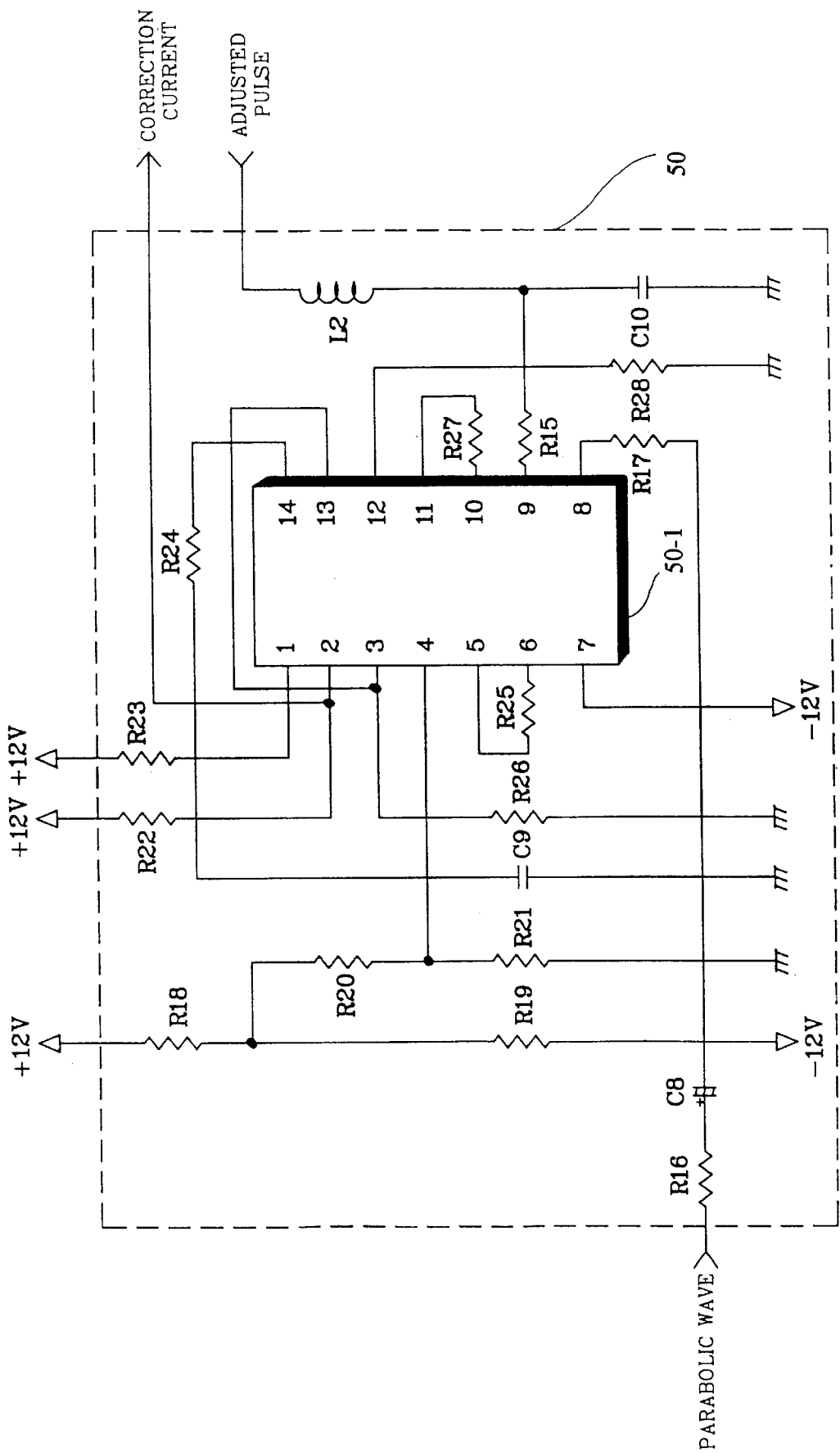
FIG. 8 is a detailed circuit diagram illustrating the multiplier of FIGS. 1 and 2.

An explanation of the construction and operation of the multiplier 50 to which the adjusted pulse is supplied from the multivibrator 40 will be discussed with reference to FIG. 8.

The multiplier 50 is comprised of: a multiplier integrated circuit 50-1 which receives and superimposes the horizontal pulse supplied from the multivibrator 40 and the adjusted parabolic wave supplied from the parabolic generator 25, a plurality of resistors RI5 to R27, capacitors C9 and C10 and coil L2. The multiplier integrated circuit is a commercially available component, such as Part No. HA-2557, manufactured by Samsung Electronics Company, Limited.

Noise within the horizontal pulse outputted from the multivibrator 40 is removed by the coil L2. The horizontal pulse in which the noise has been removed is input to the resistor R15 to thereby supply the horizontal pulse to the ninth pin of the multiplier IC 50-1. The parabolic wave supplied from the parabolic generator 25 is matched through the resistor R16 and the capacitor C8 and is input to the resistor R17 to thereby supply the parabolic wave to the eighth pin of the multiplier IC 50-1.

The multiplier IC 50-1 to which the parabolic wave and the adjusted pulse supplied to the eighth and ninth pins serves to combine the parabolic wave and the adjusted pulse to thereby output the correction current to its second pin. That is, the multiplier IC 50-1 to which a potential difference between the voltages of +12 V and –12 V is supplied through the resistors R18 and R19 serves to divide a voltage supplied through the resistors R20 and R21. The divided voltage is supplied to the fourth pin of the multiplier IC 50-1.

The voltage of +12 V supplied through the resistor R22 and the capacitor C9 is supplied to the fourteenth pin of the multiplier IC 50-1. A ground potential is supplied via the resistor R26 to the third and thirteenth pins of the multiplier IC 50-1, and the voltage of +12 V is supplied to the first pin of the multiplier IC 50-1 though resistor 23. The resistor R25 is connected to the fifth and sixth pins and the resistor R27 is connected to the tenth and eleventh pins. The ground potential is connected via the resistor R28 to the twelfth pin, and the capacitor C10 is used for smoothing.

The parabolic wave and the adjusted pulse are combined in accordance with the potentials of the voltages of +12 V and –12 V each supplied through the resistors RI0 and R19 to output the correction current for correcting the upper and lower distortion on the basis of the center of display monitor screen. The correction current is outputted by the second pin of the multiplier 50-1.

Figure 9:
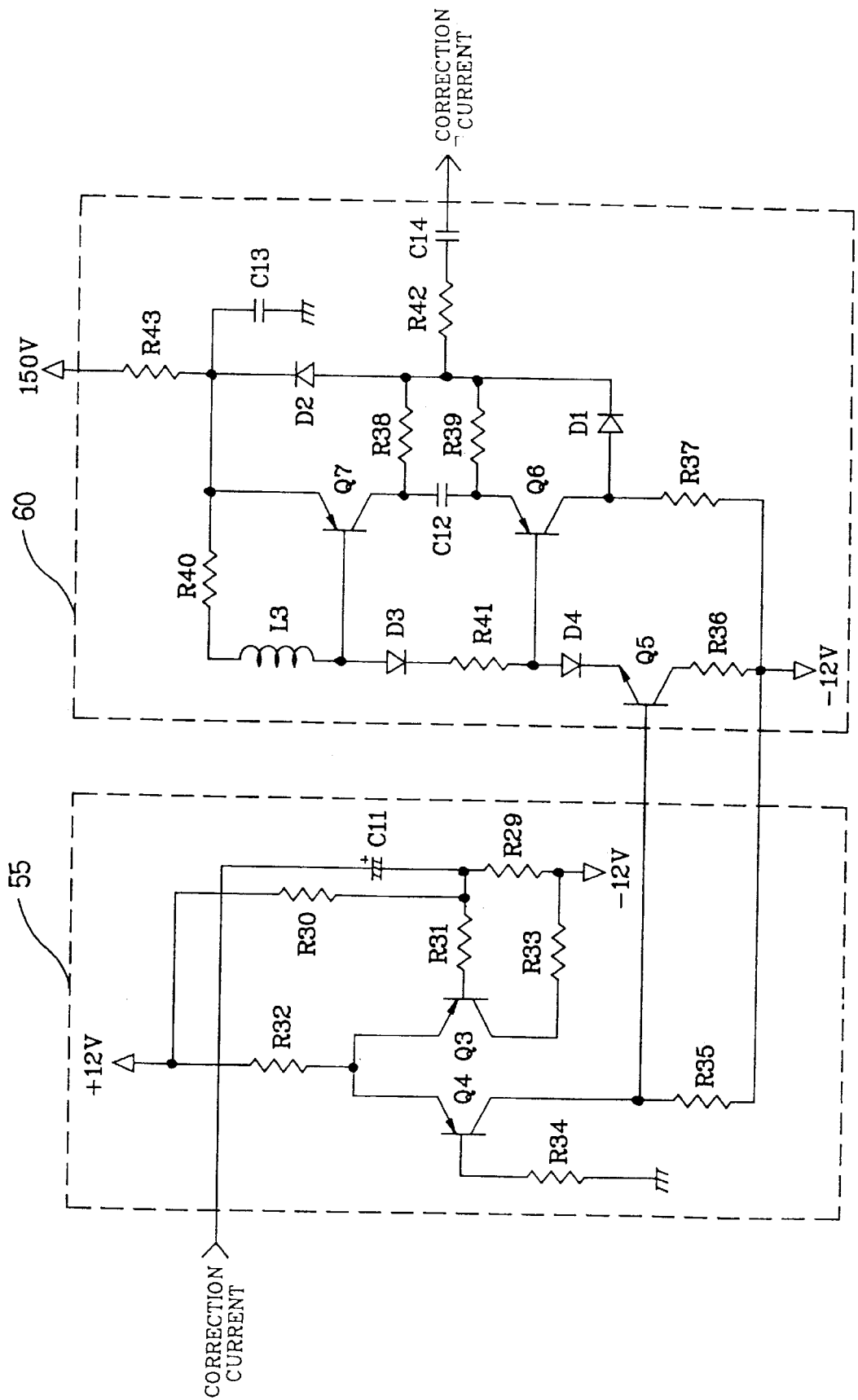
FIG. 9 is a detailed circuit diagram illustrating the buffer and the amplifying portion of FIGS. 1 and 2.

An explanation of the construction and operations of the buffer 55 and the amplifying portion 60 for stabilizing and amplifying the gain of the correction current outputted by the second pin of the multiplier 50-1 will be discussed with reference to FIG. 9.

The buffer 55 is comprised of: transistors Q3 and Q4 which serve to receive the correction current and amplify the received correction current, a plurality of resistors R29 to R35, and a capacitor C11.

On the other hand, the amplifying portion 60 is comprised of: a transistor Q5 which serves to receive the correction current and amplify the received correction current, transistors Q6 and Q7 which serve to receive the output signal from the transistor Q5 to re-amplify the received output signal, a plurality of resistors R36 to R43, and a plurality of capacitors C12 to C14, and a plurality of diodes D1 to D4.

The transistor Q3 within the buffer 55 receives the correction current supplied from the multiplier 50 to its own base terminal. The correction current is combined with the voltages of +12 V and –12 V through the resistors R29 and R30 in accordance with the potential level of the supplied correction current. A ground potential is supplied via the resistor R34 to the base terminal of the transistor Q4 and the voltage of –12 V is connected to the resistor R35.

Since the transistors Q3 and Q4 comprise a differential amplifier, they can output the correction current in a stable state. The output correction current is supplied to the base terminal of the transistor Q5 within the amplifying portion 60, in which the correction current is amplified up to a predetermined level and is supplied to the base terminal of the transistor Q6. The supplied correction current is re-amplified by the transistor Q6.

A driving voltage of +150 V for driving the transistors Q5 and Q6 is inputted through the resistor R43 to drive the transistor Q7. The correction current re-amplified by the transistor Q6 is fed back through the diodes D1 and D2 and the resistor R40, and a predetermined bandwidth of frequency of the correction current is selected through a peaking coil L3 and is supplied to the base terminal of the transistor Q7. The transistor Q7 is operated in accordance with the correction current supplied through the peaking coil L3 to thereby stabilize the correction current outputted from the transistor Q6.

Meanwhile, the driving voltage supplied to the diode D3 through the peaking coil L3 is supplied via the resistor R41 and the diode D4 to the transistor Q5. The amplified correction current from the transistors Q5 and Q6 in which noise has been removed by the resistors R36 and R39 and the capacitor C12 is outputted through the resistor R42 and the capacitor C14. The resistor R36 is used as an emitter resistor, and the resistor R37 is used as a collector resistor.

An explanation of the construction and operation of the modulation portion 65 and the vertical deflection yoke 70 to which the correction current is supplied will be discussed with reference to FIG. 10.

Figure 10:
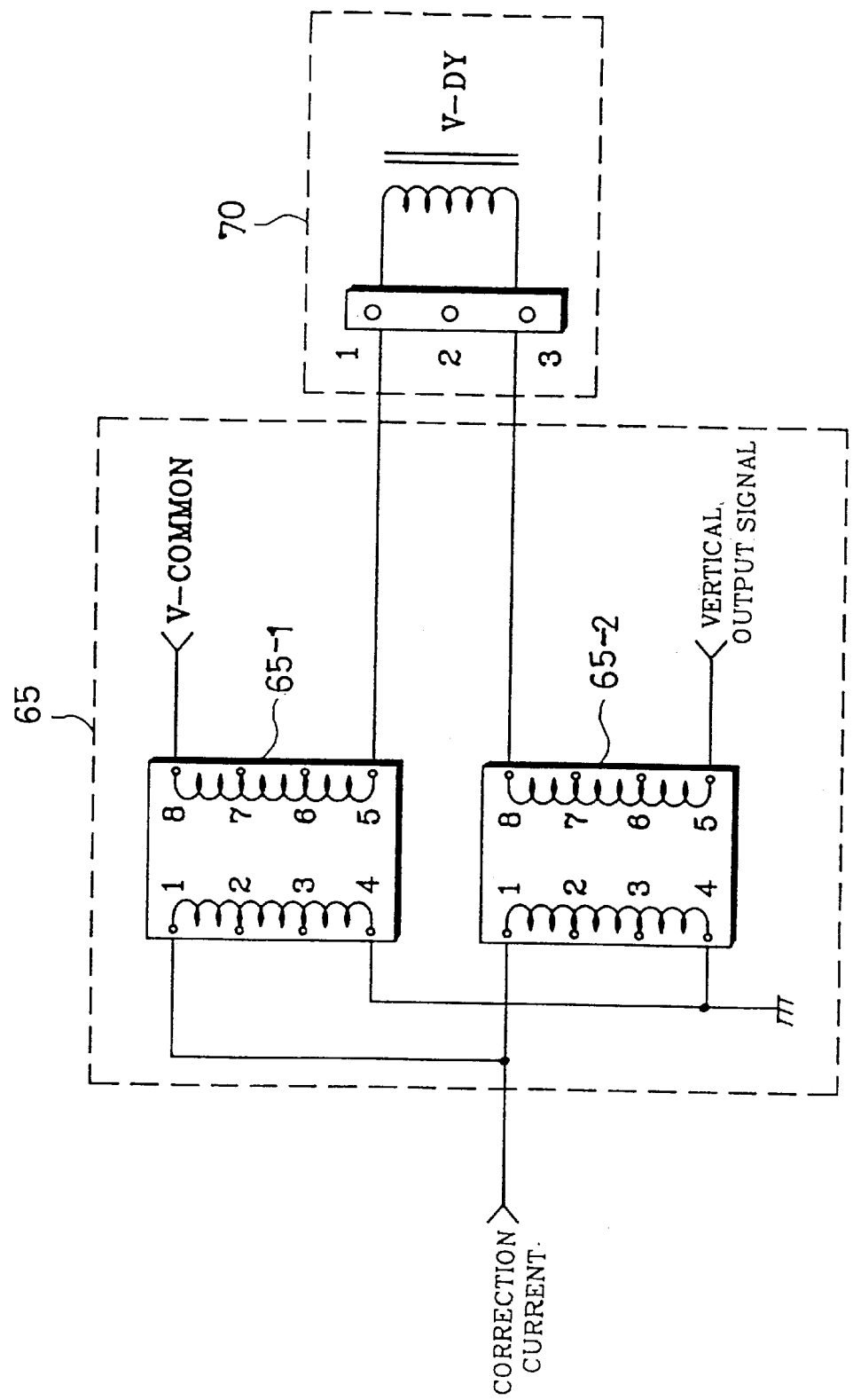
FIG. 10 is a detailed circuit diagram illustrating the modulation portion and the vertical deflection yoke of FIGS. 1 and 2.

Referring to FIG. 10, a first transformer 65-1 combines the correction current outputted from the amplifying portion 60 and a vertical common signal V-COMMON and outputs the synthesized correction wave; a second transformer 65 2 synthesizes the correction current outputted from the amplifying portion 60 and a vertical output signal and outputs the synthesized correction wave, and the vertical deflection yoke 70 receives the synthesized correction waves outputted by the first and second transformers 65-1 and 65-2 and adjusts the deflection angle of the electron beam to prevent the upper and lower distortion displayed on the display monitor screen.

The correction current outputted from the amplifying portion 60 is supplied to a first pin of the first transformer 65-1 within the modulation portion 65, the vertical common signal V-COMMON is supplied to an eighth pin thereof, and a ground potential is connected to a fourth pin thereof. The first transformer 65-1 is comprised of an EI core. Then, the first transformer 65-1 combines the supplied correction current and vertical common signal V-COMMON to thereby output the combined correction wave.

On the other hand, the correction current outputted from the amplifying portion 60 is supplied to a first pin of the second transformer 65-2 within the modulation portion 65, the vertical output signal is supplied to a fifth pin thereof, and a ground potential is connected to a fourth pin thereof. In the same manner as the first transformer 65-1, the second transformer 65-2 is comprised of an EI core. Then, the second transformer 65-2 combines the supplied correction current and vertical output signal to thereby output the combined correction wave.

The superimposed waves outputted by the first and second transformers 65-1 and 65-2 are inputted to first and third input pins of the vertical deflection yoke 70, in which the inputted correction superimposed waves are amplified to thereby correct the upper and lower distortion occurring in the display monitor screen. In other words, the vertical deflection yoke 70 adjusts the deflection angle of the electron beam to correct the upper and lower distortion displayed on the left and right edge portions of the display monitor screen.

Figure 11:
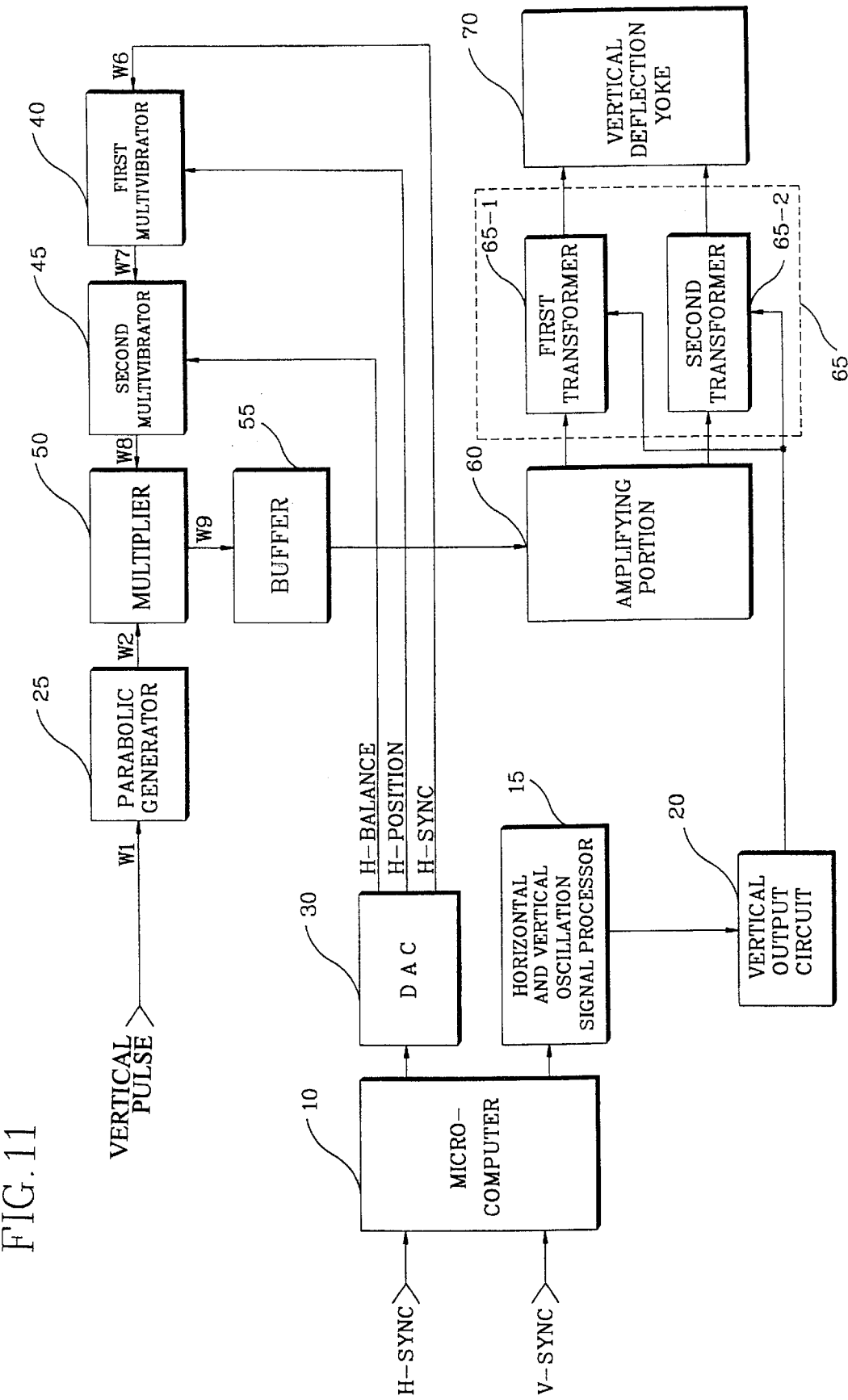
FIG. 11 is a block diagram illustrating an upper and lower distortion correcting circuit by modes according to a second embodiment of the present invention.

FIG. 11 is a block diagram illustrating an upper and lower distortion correcting circuit by modes according to a second embodiment of the present invention. A first multivibrator 40 receives the horizontal pulse according to the horizontal synchronous signal H-SYNC outputted by the microcomputer 10 to trigger the horizontal pulse in accordance with a horizontal position signal H-POSITION outputted by the digital to analog converter 30 and outputs a phase-shifted horizontal pulse; a second multivibrator 45 receives the phase shifted horizontal pulse supplied by the first multivibrator 40 to trigger the horizontal pulse in accordance with the horizontal balance signal H-BALANCE outputted by the digital to analog converter 30 and adjusts and outputs a horizontal pulse having a controlled duty cycle; and a multiplier 50 receives and multiplier the horizontal pulse outputted by the second multivibrator 45 and the parabolic wave outputted by the parabolic generator 25 to thereby output a correction current.

Figure 12:
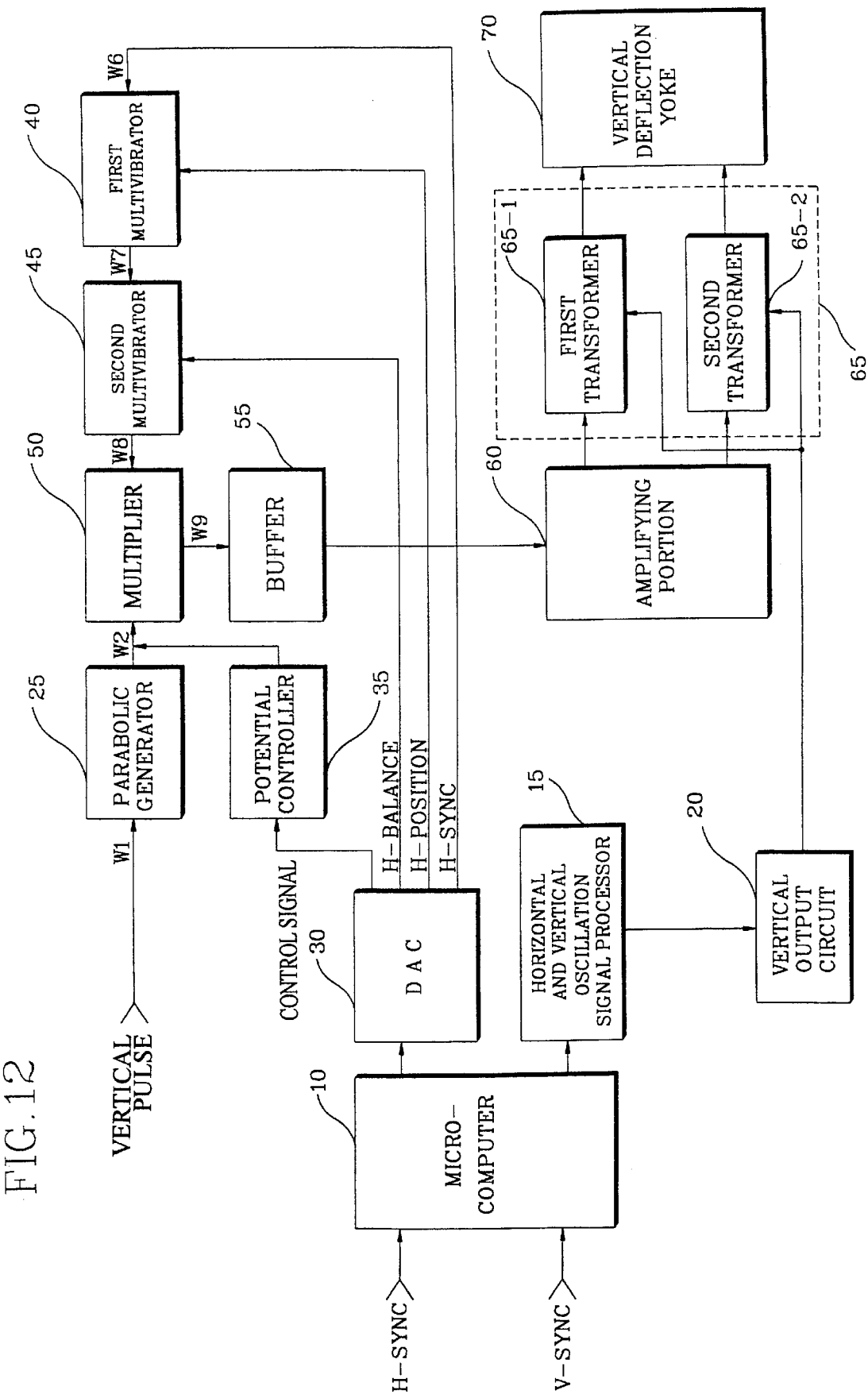
FIG. 12 is a block diagram illustrating an upper and lower distortion correcting circuit by modes according to a third embodiment of the present invention.

FIG. 12 is a block diagram illustrating an upper and lower distortion correcting circuit by modes according to a third embodiment of the present invention, in which a potential controller 35 is additionally included, as compared with FIG. 11.

Figure 13:
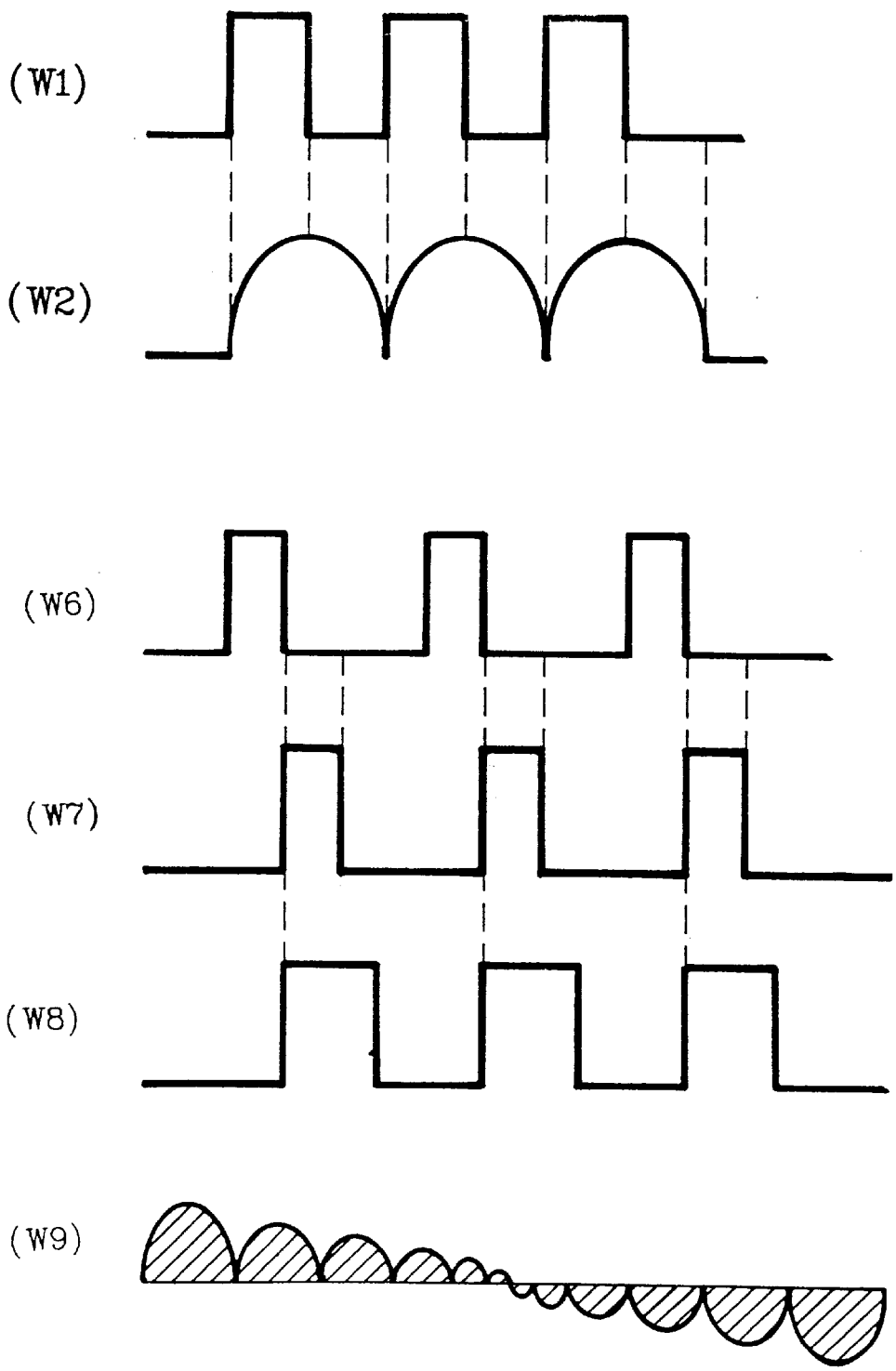
FIG. 13 is a waveform diagram illustrating output waveforms from respective blocks of FIGS. 11 and 12.

FIG. 13 is a waveform diagram illustrating output waveforms from respective blocks of FIGS. 11 and 12.

Referring to FIG. 13, a waveform "W1" indicates the vertical pulse, and a waveform "W2" indicates the parabolic wave generated in accordance with a period of the vertical pulse by the parabolic generator 25. A waveform "W6" represents the horizontal pulse, and a waveform "W7" indicates the phase-shifted horizontal pulse through the first multivibrator 40. A waveform "W8" indicates a pulse generated by adjusting the amplitude of the horizontal pulse of waveform 'W7" by modes by the second multivibrator 45.

A waveform "W9" represents the correction current generated by the multiplier 50 which combines the waveforms "W2" and "W8". In other words, the waveform "W2" of the parabolic wave and the adjusted pulse are multiplied by the multiplier 50 to generate the correction current. The curved areas hatched upwardly indicates the corrected amount of upper distortion on the display monitor screen and contrarily, the curved areas hatched downwardly indicates the corrected amount of lower distortion on the display monitor screen.

The waveform "W9" indicative of the correction current is superimposed on the vertical pulse through the modulation portion 65.

Figure 14:
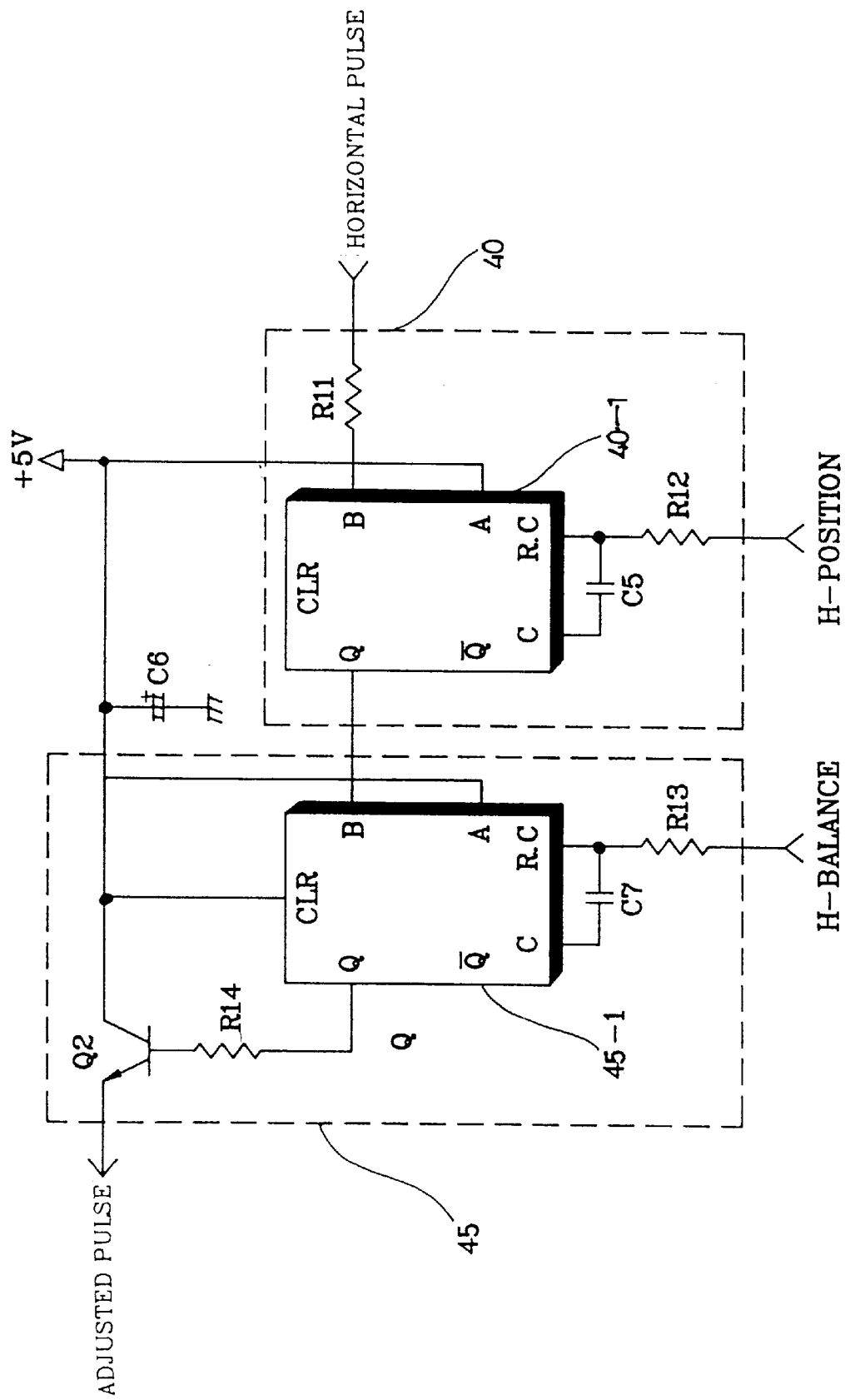
FIG. 14 is a detailed circuit diagram illustrating the first and second multivibrators of FIGS. 11 and 12.

FIG. 14 is a detailed circuit diagram illustrating the first and second multivibrators of FIGS. 11 and 12.

A first multivibrator integrated circuit 40-1 within the first multivibrator 40 receives the horizontal pulse and the triggering signal according to the horizontal position signal H-POSITION to thereby generate the phase-shifted horizontal pulse; a second multivibrator integrated circuit(IC) 45-1 within the second multivibrator 45 receives the phase-shifted horizontal pulse supplied by the first multivibrator IC 40-1 to adjust the duty cycle of horizontal pulse for the triggering signal in accordance with the horizontal balance signal H-BALANCE, a transistor Q2 receives the adjusted pulse outputted by the second multivibrator IC 45-1 and is switched in accordance with the adjusted pulse, a plurality of resistors RI I to R14, and a plurality of capacitors C5 to C7 are also provided.

The first multivibrator 40 receives the horizontal pulse according to the horizontal synchronous signal H-SYNC outputted by the microcomputer 10 at an input terminal "B" of the first multivibrator IC 40-1, receives a driving voltage of +5 V at an input terminal "A" of the first multivibrator IC 40-1, and receives the horizontal position signal H-POSITION outputted by the digital to analog converter 30 at a terminal "RC" of the first multivibrator IC 40-1.

The horizontal position signal H-POSITION is converted into a sawtooth wave by the resistor R12 and the capacitor C5 and is supplied to the terminal "C" of the first multivibrator IC 40-1. The converted sawtooth serves to trigger the first multivibrator TC 40-1 within the first multivibrator 40.

The first multivibrator IC 40-1 generates the phase-shifted pulse at an output terminal "Q" thereof Whenever the trigger pulse is supplied through the terminal "C", a single phase-shifted pulse is outputted through the output terminal "Q". The outputted phase-shifted pulse is supplied to an input terminal "B" of the second multivibrator IC 45-1 within the second multivibrator 45, and a driving voltage of +5 V is supplied to an input terminal "A" of the second multivibrator IC 45-1.

The second multivibrator IC 45-1 receives the horizontal balance signal H-BALANCE via the resistor R13 and the capacitor C7 at a terminal "C" thereof. The horizontal balance signal H-BALANCE is converted into the sawtooth wave by the resistor R13 and the capacitor C7 to thereby trigger the second multivibrator IC 45-1. In other words, the timing or triggering is determined in accordance with the horizontal balance signal H-BALANCE for the video mode to define the amplitude of the phase-shifted pulse supplied to the second multivibrator IC 45-1. If the timing of triggering is determined by video modes, the pulse having its amplitude adjusted by mode is outputted through an output terminal "Q" of the second multivibrator IC 45-1.

The output adjusted pulse is supplied to the base terminal of the transistor Q2 via the resistor R14, and the transistor Q2 is switched in accordance with the supplied adjusted pulse and outputs the adjusted pulse. The capacitor C6 is used for smoothing.

An explanation of a state where upper and lower distortion appearing on the display monitor screen is corrected by using the upper and lower distortion correcting circuit will be discussed with reference to FIGS. 15A and 15B.

Figure 15A:
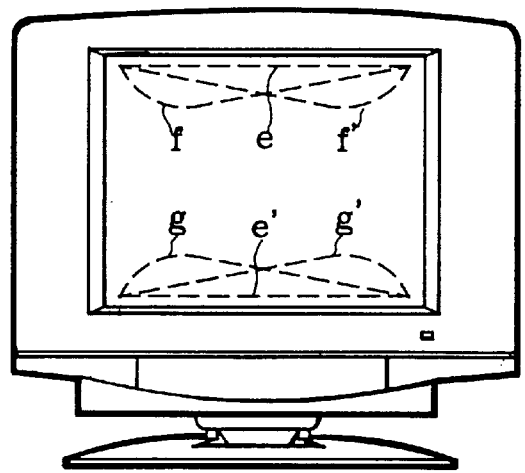
FIG. 15A is a state view illustrating an operation of correcting the upper and lower distorted image generated in an edge portion of the display monitor screen.

FIG. 15A is a state view illustrating an operation of correcting the upper and lower distorted image generated in an edge portion of the display monitor screen. Referring to FIG. 15A, as the horizontal period is moved, the moved horizontal period is superimposed on the vertical output signal to generate the upper and lower distorted images f and f' and g and g' on the edge portion of the display monitor screen. The generated upper and lower distorted images can be adjusted to desired images by freely adjusting the vertical period by the first multivibrator 40. In other words, the distorted images f and f' can be converted into the distorted images g and g', or into normal image e and e'.

Figure 15B:
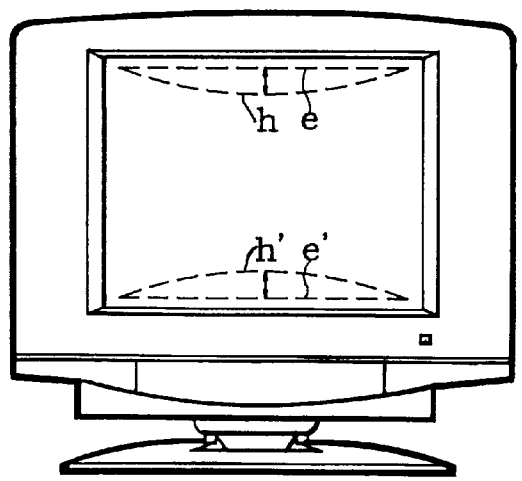
FIG. 15B is a state view illustrating an operation of correcting the upper and lower distorted image according to an amplifying ratio variation in the upper and lower distortion correcting circuit according to the present invention.

FIG. 15B shows distorted images h and h' displayed by the upper and lower distortion according to an amplifying ratio variation of the amplifying portion 60. The distorted images h and h' can be converted to the normal images e and e' by changing the amplifying ratio by modes through the amplifying portion 60.

As clearly apparent from the foregoing, an upper and lower distortion correcting circuit by modes according to the present invention can effectively correct upper and lower distortion on a display monitor screen generated by video modes by synthesizing a parabolic wave and a horizontal pulse to generate a correction current.

It will be apparent to those skilled in the art that various modifications and variations can be made in an upper and lower distortion correcting circuit by modes of the present invention without departing from the spirit or scope of the invention. Thus, it is intended that the present invention cover the modifications and variations of this invention provided they come within the scope of the appended claims and their equivalents.

What is claimed is:

1. An upper and lower distortion correcting circuit by modes in a display device, said circuit comprising:
    a parabolic generator for receiving a vertical pulse and for generating a parabolic wave in accordance with the received vertical pulse;
    a multivibrator for receiving a horizontal pulse outputted by a microcomputer via a digital to analog converter and for triggering the horizontal pulse in accordance with a horizontal balance signal outputted by said digital to analog converter to adjust and output a triggered horizontal pulse having a controlled duty cycle;
    a multiplier for multiplying the horizontal pulse outputted by said multivibrator and the parabolic wave outputted by said parabolic generator to thereby output a correction current;
    a buffer for stabilizing and outputting the correction current outputted by said multiplier;
    an amplifying portion for receiving and amplifying the correction current outputted by said buffer; and
    a modulation portion for receiving the correction current outputted by said amplifying portion and the vertical pulse and for superimposing the correction current and the vertical pulse.

2. The circuit as defined in claim 1, said parabolic generator being comprised of a transistor for receiving the vertical pulse and being switched in accordance with the received vertical pulse, and an operational amplifier for receiving an output signal from said transistor and for comparing the output signal with a ground voltage to output a compared result.

3. The circuit as defined in claim 1, said multivibrator being comprised of a multivibrator integrated circuit for receiving the horizontal pulse and the horizontal balance signal to thereby generate a phase-shifted horizontal pulse.

4. The circuit as defined in claim 1, said multivibrator being comprised of a first multivibrator for receiving the horizontal pulse to trigger the horizontal pulse in accordance with a horizontal position signal outputted by said digital to analog converter and for outputting a phase-shifted horizontal pulse, and a second multivibrator for receiving the phase shifted horizontal pulse supplied from said first multivibrator to trigger the horizontal pulse in accordance with the horizontal balance signal outputted by said digital to analog converter and for adjusting the duty cycle of the horizontal pulse.

5. The circuit as defined in claim 1, said multiplier being comprised of a multiplier integrated circuit for receiving a phase-shifted horizontal pulse supplied from said multivibrator and the parabolic wave supplied from said parabolic generator to multiply the phase-shifted horizontal pulse and the parabolic wave.

6. The circuit as defined in claim 1, said modulation portion being comprised of a first transformer for receiving and combining the correction current outputted by said amplifying portion and a vertical common signal, and a second transformer for receiving and combining the correction current outputted by said amplifying portion and the vertical pulse.

7. The circuit as defined in claim 1, further comprising a potential controller for receiving a video control signal according to a video mode supplied from said digital to analog converter to supply a potential level signal according to a video control signal mode to said multiplier.

8. The circuit as defined in claim 7, said potential controller being comprised of an operational amplifier for receiving and comparing the video control signal.

9. An upper and lower distortion correcting circuit, comprising:
    a parabolic generator generating parabolic waves corresponding to vertical pulses received by the generator;
    an analog signal source providing a horizontal balance signal and first horizontal pulses;
    a multivibrator stage generating a triggered horizontal pulse exhibiting a controlled duty cycle by triggering said first horizontal pulses in accordance with said horizontal balance signal;
    a multiplier providing a correction current by multiplying said triggered horizontal pulse and said parabolic waves, and
    a modulator superimposing said correction current upon said vertical pulse.

10. The circuit of claim 9, with said parabolic generator comprised of:
    a transistor having a control electrode coupled to operationally respond to said vertical pulse signal by providing an output signal; and an operational amplifier coupled to receive and make a comparison of said output signal with a reference potential, and provide a resulting signal on the basis of said comparison.

11. The circuit of claim 9, with said multivibrator stage comprised of an integrated circuit generating a phase-shifted horizontal pulse in response to reception of receive said first horizontal pulses and said horizontal balance signal.

12. The circuit of claim 9, with said analog signal source generating providing a horizontal position signal; and
    said multivibrator stage being comprised of:
        a first multivibrator device generating a phase-shifted horizontal pulse by triggering said first horizontal pulse in accordance with a horizontal position signal; and
        a second multivibrator device responding to said phase-shifted horizontal pulse by triggering said first horizontal pulses in accordance with said horizontal balance signal, and by adjusting said duty cycle of said triggered horizontal pulse.

13. A method of correcting upper and lower distortion by modes in a display device, said method comprising the steps of:
    receiving a vertical pulse and generating a parabolic wave in accordance with the received vertical pulse;
    receiving a horizontal pulse outputting by a microcomputer via a digital to analog converter and triggering the horizontal pulse in accordance with a horizontal balance signal outputted by said digital to analog converter to adjust and output a triggered horizontal pulse having a controlled duty cycle;
    multiplying the triggered horizontal pulse and the parabolic wave to thereby output a correction current;
    stabilizing the correction current;
    receiving and amplifying the correction current; and
    receiving the amplified correction current and the vertical pulse and superimposing the correction current and the vertical pulse.

* * * * *